United States Patent [19]
Takatsuki

[11] 3,949,251
[45] Apr. 6, 1976

[54] STEPPING MOTOR FOR A TIMEPIECE
[75] Inventor: Tatsuo Takatsuki, Matsudo, Japan
[73] Assignee: Kabushiki Kaisha Daini Seikosha, Japan
[22] Filed: Sept. 4, 1974
[21] Appl. No.: 503,480

[30] Foreign Application Priority Data
Sept. 5, 1973 Japan.................. 48-104000[U]

[52] U.S. Cl.............. 310/49 R; 310/90; 310/156; 58/23 D; 58/28 A
[51] Int. Cl.² ...................................... H02K 37/00
[58] Field of Search ............... 310/49, 162–165, 310/156, 90, 40 MM; 58/23 D, 28 A

[56] References Cited
UNITED STATES PATENTS
3,803,430 4/1974 da Costa et al.................. 310/90 X
3,858,070 12/1974 Hallerback........................... 310/90

Primary Examiner—Donovan F. Duggan
Attorney, Agent, or Firm—Robert E. Burns; Emmanuel J. Lobato; Bruce L. Adams

[57] ABSTRACT

This invention relates to a stepping motor for a timepiece. The supporting means for the bearing of the rotor shaft is fixed on the base plate and it is coaxial to the rotor shaft. It is used both as the supporting means for the bearing of the rotor shaft and positioning means for stators. Since delicate adjustment of stators is eliminated, it is easy to assemble and to keep high reliability.

7 Claims, 3 Drawing Figures

STEPPING MOTOR FOR A TIMEPIECE

BACKGROUND OF THE INVENTION

This invention relates to a stepping motor for a timepiece which eliminates positional adjustment between the rotor and stators.

In a conventional stepping motor for a timepiece, positional adjustment between the rotor and stators is carried out to obtain enough output torque and to start its rotation in a predetermined direction.

Then a fine adjustment of the stator is made for stabilizing the efficiency of the motor. An adjusting mechanism is provided on the stator to effect the necessary adjustments thereby increasing the number of component parts.

Because of this type construction, the assembling process of the motor is complicated and it is impossible to reduce the cost of the motor. To make matters worse, once it is disassembled, it is very difficult to reassemble so as to restore its efficiency again. Hence it is inconvenient for servicing and repairing at shops.

SUMMARY OF THE INVENTION

One object of this invention is to provide a stepping motor for a timepiece wherein the adjusting process is eliminated.

Another object of this invention is to provide a stepping motor for a timepiece having fewer component parts than motors which are presently in use in timepieces.

According to this invention, the stators are automatically positioned in precise, predetermined position during the assembling process so that the motor construction is simplified and the cost of the motor is reduced. Furthermore, it is very easy to revive the motor efficiency again once it is disassembled thereby making it convenient for servicing and repair.

The foregoing objects and other objects as well as the characteristic features of the invention will become more apparent and more readily understandable by the following description and the appended claims when read in conjunction with the accompanying drawings.

DETAILED DESCRIPTION OF THE INVENTION

Now it will be explained about the embodiment of this invention according to drawings.

Figure 1:
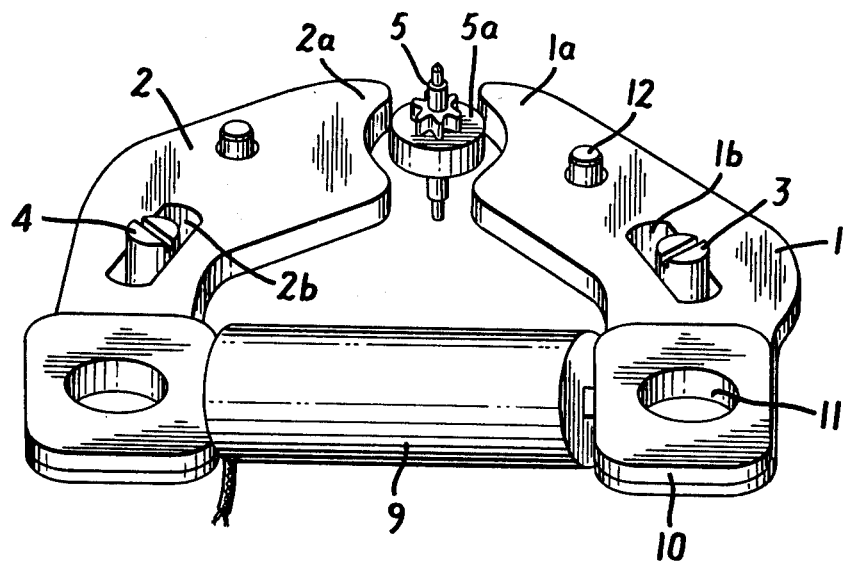
FIG. 1 shows a perspective view of the coventional stepping motor.

FIG. 1 shows a conventional stepping motor for a watch, which is assembled with a rotor 5 having a permanent magnet 5a, a coil 9 having a core 10, and two stators 1 and 2. Each end of the core 10 has a hole 11 for receiving a screw to mount the stepping motor on a support plate. Each stator 1 and 2 has an eccentric pins 3 and 4 respectively engaging with a slender hole 1b and 2b provided in the stators.

When the eccentric pin 3 is rotated, the stator 1 is turned about a pivot pin 12. The stator 2 is likewise turnable in the same way as the stator 1. By such a construction, the ends of the stators 1a and 2a are movable towards the rotor 5 or away from it, so the rotor 5 is easily able to be adjusted to the appropriate position to maximize its efficiency.

Figure 2:
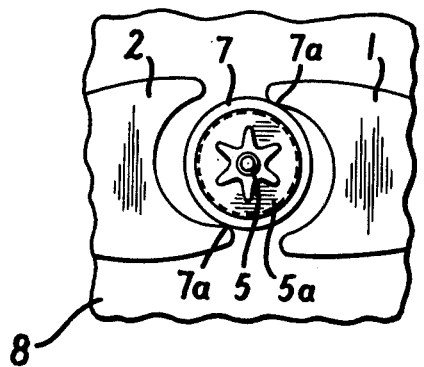
FIG. 2 is a top plan view showing the essential parts of a stepping motor according to this invention.
Figure 3:
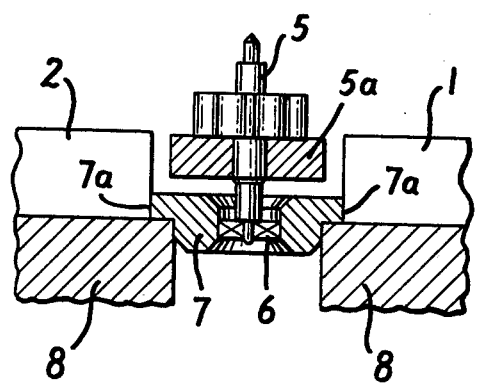
FIG. 3 is an enlarged cross-sectional view of the parts shown of FIG. 2.

FIGS. 2 and 3 show one embodiment of this invention and the same reference numerals denote the same parts shown in FIG. 1.

In accordance with the invention, a positioning or supporting means 7 fixed on a base plate 8 and rotably supports a bearing 6. The supporting means 7 is disposed coaxially with the rotor axis as seen in FIG. 3, and comprises a support member having a stepped shape with a narrow portion mounted within the opening in the base plate 8 and a wide portion of generally circular profile. The stators 1 and 2 are disposed such that their end faces touch with side wall 7a of the means 7 and they are fixed on the base plate 8. The end faces of the stators are arcuately concave so that the outer periphery of the support member 7 makes direct contact with each end face at only one location thereby defining the predetermined positions of the stator pieces and thereby the predetermined rotor stop positions. The side wall 7a of the means 7 thus acts as a guide for positioning and maintaining the stators. Other component parts are not shown, however, they are similar to those of FIG. 1.

While a preferred embodiment of the invention has been shown and described it will be understood that many modifications and changes can be made within the true spirit and scope of the invention.

For example, the supporting means for the bearing of the rotor shaft and the bearing itself can be composed in one piece.

I claim:

1. In a stepping motor for a timepiece of the type having a rotor including a permanent magnet and a rotor shaft and being rotationally driven during use in a stepwise manner between successive rotor stop positions: a plurality of stator pieces having respective end faces disposed circumferentially about and spaced from said rotor in predetermined positions and jointly defining therewith predetermined rotor stop positions; positioning means in direct engagement with said end faces for accurately positioning and maintaining said end faces in said predetermined positions thereby defining said predetermined rotor stop positions; and bearing means on said positioning means for rotatably bearing said rotor shaft.

2. A stepping motor according to claim 1; wherein said positioning means comprises a support member having peripheral side wall portions in direct engagement with said end faces.

3. A stepping motor according to claim 2; wherein said support member has a generally circular profile and is mounted coaxially with said rotor shaft.

4. A stepping motor according to claim 1; wherein each of said end faces is arcuately concaved; and said positioning means has a generally circular profile which directly engages the arcuately concave end faces at one location thereof thereby defining said predetermined positions.

5. A stepping motor according to claim 1; including a base plate superposed on said stator pieces and having an opening therein opposite said rotor; said positioning means having one portion thereof mounted within said opening such that that said bearing means is coaxial with and rotatably bears said rotor shaft another portion thereof which is not mounted within said opening in direct engagement with said end faces.

6. A stepping motor according to claim 5; wherein said positioning means comprises a support member having a narrow portion extending into said opening thereby mounting said support member on said base plate and a wide portion whose outer periphery engages with said end faces.

7. A stepping motor according to claim 6; wherein each of said end faces is arcuately concaved; and said wide portion of said support member has a generally circular profile which directly engages the arcuately concave end faces at one location thereof thereby defining said predetermined positions.

* * * * *